(12) United States Patent
Shen

(10) Patent No.: US 7,087,347 B2
(45) Date of Patent: Aug. 8, 2006

(54) VEHICLE BATTERY JAR STRUCTURE

(76) Inventor: Tung-Ming Shen, No. 1, Lane 47, Pao Chien St., Chiayi (TW)

( * ) Notice: Subject to any disclaimer, the term of this patent is extended or adjusted under 35 U.S.C. 154(b) by 522 days.

(21) Appl. No.: 10/639,296

(22) Filed: Aug. 12, 2003

(65) Prior Publication Data

US 2005/0037260 A1    Feb. 17, 2005

(51) Int. Cl.
*H01M 2/04*    (2006.01)
(52) U.S. Cl. ............................ 429/175; 429/72; 429/87
(58) Field of Classification Search ..................... None
See application file for complete search history.

(56) References Cited

U.S. PATENT DOCUMENTS 6,693,408 B1 *    2/2004    Rodriguez et al. .......... 320/112

* cited by examiner

*Primary Examiner*—Michael Barr
*Assistant Examiner*—Karie O'Neill
(74) *Attorney, Agent, or Firm*—Alan D. Kamrath; Nikolai & Mersereau, P.A.

(57) ABSTRACT

A battery jar structure includes a main body, a top cover, a plurality of urging members, a plurality of inner covers, a first top plate, and a second top plate. Thus, the guide portion of each of the support recesses of the top cover and each of the urging members form a double separation effect and an air convection effect.

11 Claims, 7 Drawing Sheets

VEHICLE BATTERY JAR STRUCTURE

BACKGROUND OF THE INVENTION

1. Field of the Invention

The present invention relates to a battery jar structure, and more particularly to a battery jar structure for a vehicle, such as the motorcycle.

2. Description of the Related Art

A conventional battery jar 10 in accordance with the prior art shown in FIGS. 5–7 comprises a main body 20 having an inside formed with a plurality of receiving chambers 201 each containing two electrodes 202, a top cover 30 mounted on a top of the main body 20 and having a surface having a first side formed with a plurality of through holes 301 each having a periphery formed with an annular groove 302 and a second side formed with a plurality of electrolyte inlets 303, a plurality of inner covers 40 each inserted into the annular groove 302 of a respective one of the through holes 301 of the top cover 30, a first top plate 50 mounted in a first opening 304 formed in the top of the top cover 30, and a second top plate 60 mounted in a second opening 305 formed in the top of the top cover 30. In practice, the electrolyte 70 is filled through each of the electrolyte inlets 303 of the top cover 30 into each of the receiving chambers 201 of the main body 20.

However, when the electrolyte 70 is filled into each of the receiving chambers 201 of the main body 20 or when the vehicle is disposed at the charging state, the electrolyte 70 easily produces acid vapor in the receiving chambers 201 of the main body 20, and the acid vapor produced in each of the receiving chambers 201 of the main body 20 will flow upward to touch the inner covers 40, thereby forming acid water drops which easily damage the parts contained in the main body 20, so that the parts contained in the main body 20 are easily oxidized and eroded during a period of time, and the lifetime of the conventional battery jar 10 is shortened.

In addition, as shown in FIG. 7, when the main body 20 is declined or upset, the electrolyte 70 contained in the main body 20 easily leaks outward through the gap defined between of each of the through holes 301 of the top cover 30 and a respective one of the inner covers 40, thereby decreasing the lifetime of the conventional battery jar 10.

SUMMARY OF THE INVENTION

The primary objective of the present invention is to provide a battery jar structure for a vehicle, such as the motorcycle.

Another objective of the present invention is to provide a battery jar structure, wherein the acid vapor produced in each of the receiving chambers of the main body can be introduced through the two transverse holes of the guide portion of each of the support recesses of the top cover and can be returned into each of the receiving chambers of the main body, thereby preventing the electrolyte from leaking outward, and thereby increasing the lifetime of the battery jar structure.

A further objective of the present invention is to provide a battery jar structure, wherein the guide portion of each of the support recesses of the top cover, each of the urging members and each of the inner covers form a close sealing effect, so that the electrolyte cannot flow outward to the ambient environment, thereby preventing the electrolyte from leaking outward when the main body is declined or upset.

A further objective of the present invention is to provide a battery jar structure, wherein the guide portion of each of the support recesses of the top cover and each of the urging members form a double separation effect and achieve an air convection purpose.

In accordance with the present invention, there is provided a battery jar structure, comprising:

a main body;

a top cover mounted on a top of the main body and formed with a plurality of support recesses each having an inner periphery formed with an annular flange having a bottom provided with a hollow guide portion having a bottom formed with two transverse holes aligning with each other; and a plurality of urging members each mounted in a respective one of the support recesses of the top cover and each having a bottom formed with two transverse holes aligning with each other.

Further benefits and advantages of the present invention will become apparent after a careful reading of the detailed description with appropriate reference to the accompanying drawings.

DETAILED DESCRIPTION OF THE INVENTION

Figure 1:
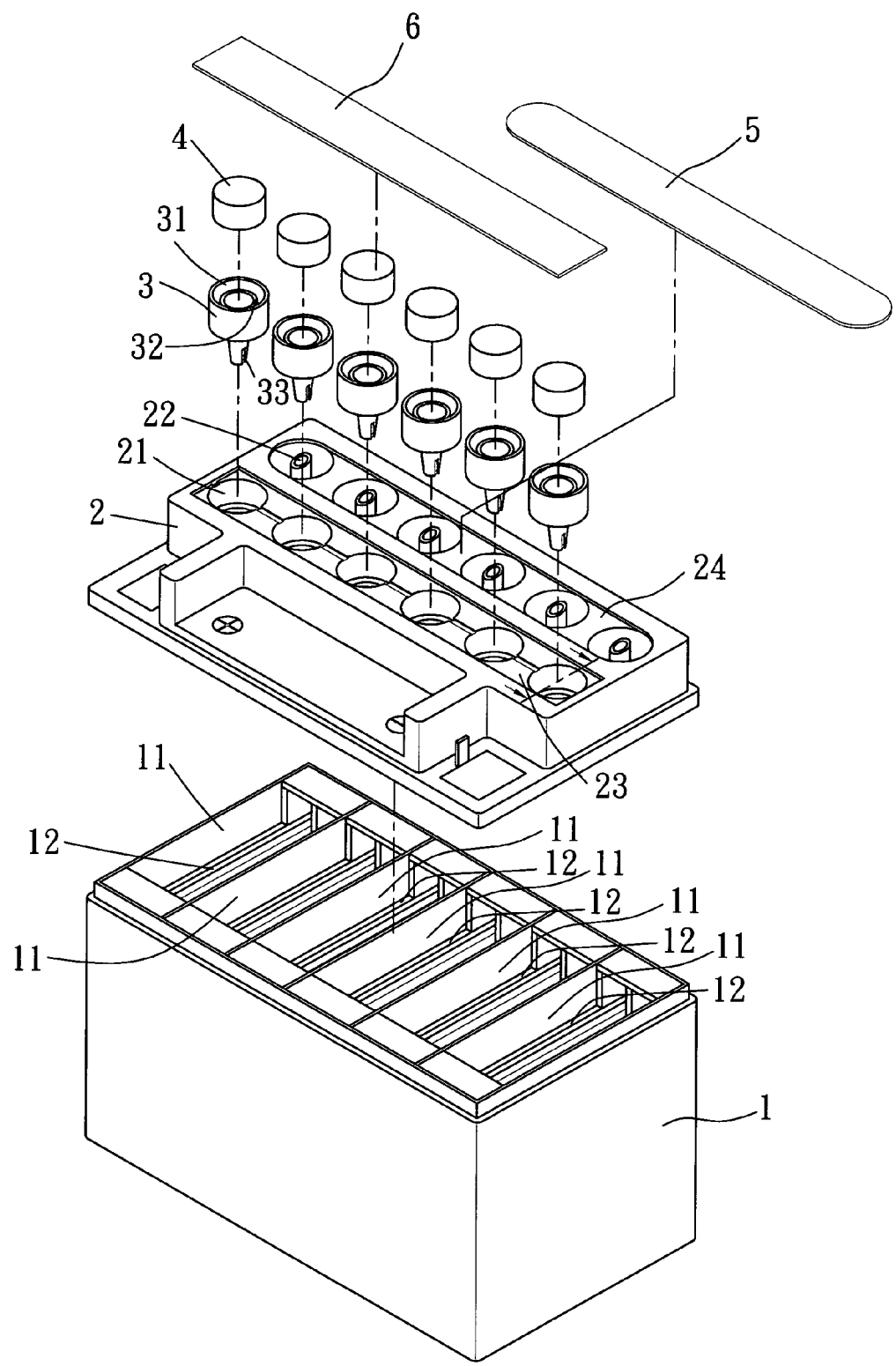
FIG. 1 is an exploded perspective view of a battery jar structure in accordance with the preferred embodiment of the present invention.
Figure 2:
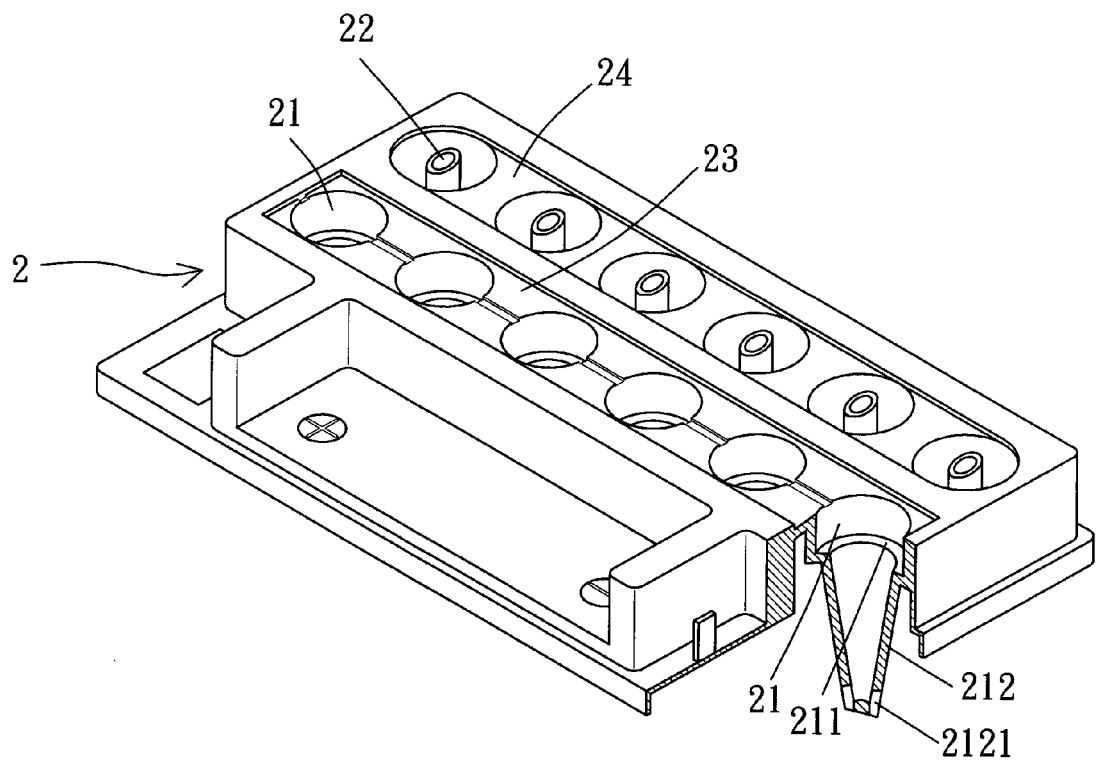
FIG. 2 is a partially cut-away perspective cross-sectional view of a top cover of the battery jar structure as shown in FIG. 1.
Figure 3:
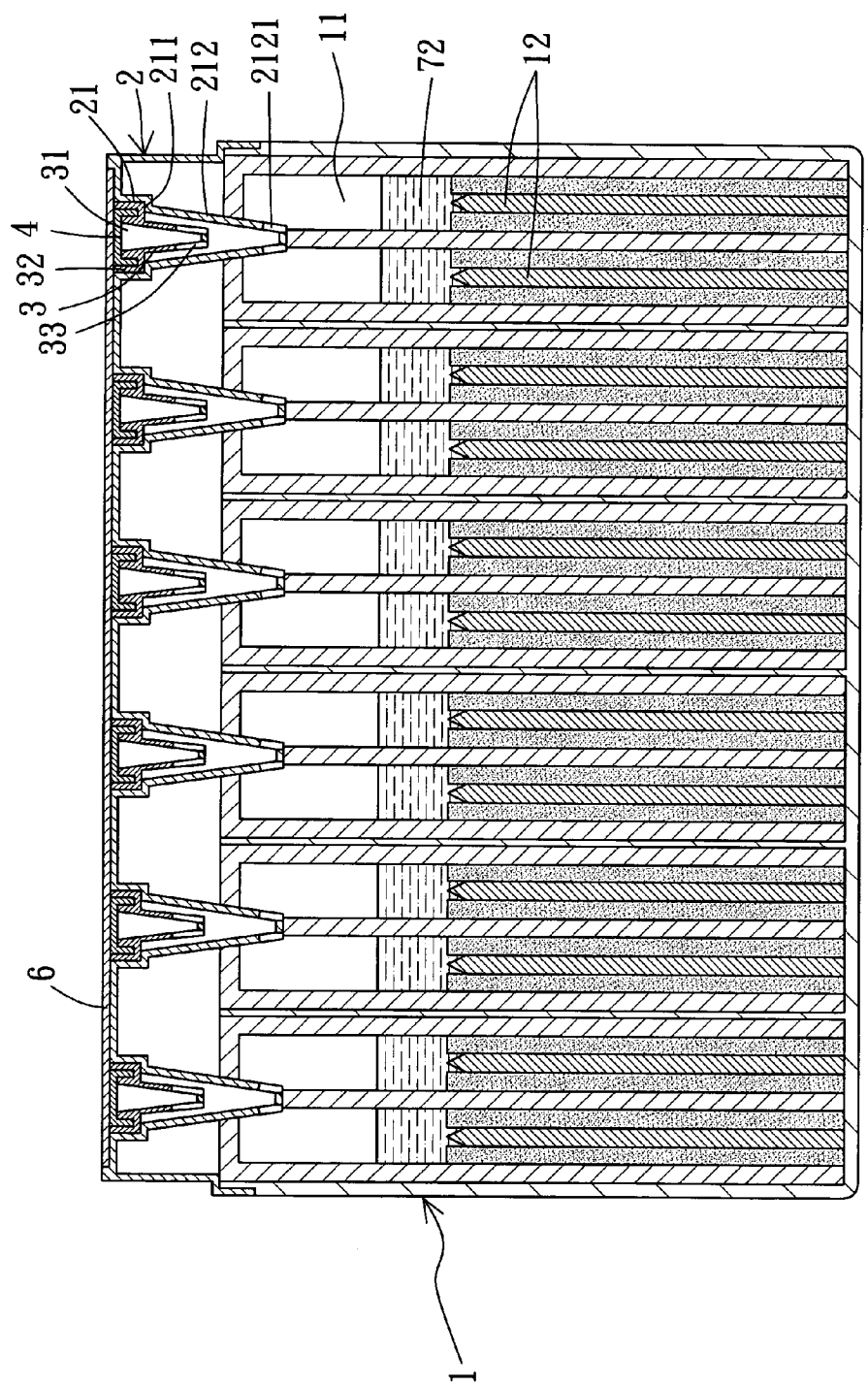
FIG. 3 is a plan cross-sectional assembly view of the battery jar structure as shown in FIG. 1.

Referring to the drawings and initially to FIGS. 1–3, a battery jar structure in accordance with the preferred embodiment of the present invention comprises a main body 1, a top cover 2, a plurality of urging members 3, a plurality of inner covers 4, a first top plate 5, and a second top plate 6.

The main body 1 has an inside formed with a plurality of receiving chambers 11 each containing two electrodes 12.

The top cover 2 is mounted on a top of the main body 1 and has a surface having a first side formed with a plurality of support recesses 21 each aligning with a respective one of the receiving chambers 11 of the main body 1 and a second side formed with a plurality of electrolyte inlets 22 each aligning with a respective one of the receiving chambers 11 of the main body 1. The support recesses 21 of the top cover 2 form a support zone 23, and the electrolyte inlets 22 of the top cover 2 form a filling zone 24.

Figure 1A:
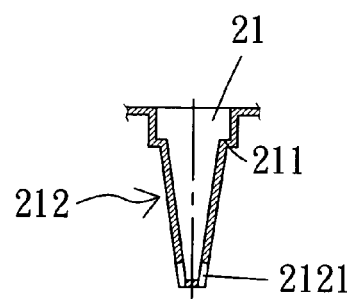
FIG. 1A is a partially plan cross-sectional view of a guide portion of the battery jar structure as shown in FIG. 1.

Each of the support recesses 21 of the top cover 2 has an inner periphery formed with an annular flange 211 (see FIG. 1A). The annular flange 211 of each of the support recesses 21 of the top cover 2 has a bottom provided with a hollow guide portion 212. Preferably, the annular flange 211 of each of the support recesses 21 of the top cover 2 is integrally formed with the guide portion 212. The guide portion 212 of each of the support recesses 21 of the top cover 2 has a bottom formed with two transverse holes 2121 aligning with each other. Preferably, the guide portion 212 of each of the support recesses 21 of the top cover 2 has a funnel shape.

Each of the urging members 3 is mounted in a respective one of the support recesses 21 of the top cover 2, and is rested on the annular flange 211 of a respective one of the support recesses 21 of the top cover 2. Each of the urging members 3 has an inside formed with a through hole 31. Each of the urging members 3 has a top having a periphery formed with an annular groove 32 and a bottom formed with two transverse holes 33 aligning with each other. Preferably, the bottom of each of the urging members 3 has a funnel shape. In addition, the bottom of each of the urging members 3 is inserted into the guide portion 212 of a respective one of the support recesses 21 of the top cover 2.

Each of the inner covers 4 is mounted on a respective one of the urging members 3 and has a bottom inserted into the annular groove 32 of a respective one of the urging members 3.

The first top plate 5 is mounted on the top cover 2 and is received in the filling zone 24 of the top cover 2.

The second top plate 6 is mounted on the top cover 2 and is received in the support zone 23 of the top cover 2.

In assembly, referring to FIG. 3 with reference to FIGS. 1 and 2, the top cover 2 is mounted on a top of the main body 1, and the guide portion 212 of each of the support recesses 21 of the top cover 2 is inserted into a respective one of the receiving chambers 11 of the main body 1. Then, each of the urging members 3 is mounted in a respective one of the support recesses 21 of the top cover 2, and is rested on the annular flange 211 of a respective one of the support recesses 21 of the top cover 2, with the bottom of each of the urging members 3 being inserted into the guide portion 212 of a respective one of the support recesses 21 of the top cover 2. Then, the electrolyte 72 is filled through each of the electrolyte inlets 22 of the top cover 2 into each of the receiving chambers 11 of the main body 1.

In practice, when the electrolyte 72 is filled into each of the receiving chambers 11 of the main body 1 or when the vehicle is disposed at the charging state, the electrolyte 72 easily produces acid vapor in the receiving chambers 11 of the main body 1, and the acid vapor produced in each of the receiving chambers 11 of the main body 1 will flow upward. At this time, the acid vapor can be introduced through the two transverse holes 2121 of the guide portion 212 of each of the support recesses 21 of the top cover 2 and the two transverse holes 33 of each of the urging members 3, and can be drained outward to the ambient environment.

Then, each of the inner covers 4 is mounted on a respective one of the urging members 3 with its bottom being inserted into the annular groove 32 of a respective one of the urging members 3. Finally, the first top plate 5 is mounted on the top cover 2 and is received in the filling zone 24 of the top cover 2, and the second top plate 6 is mounted on the top cover 2 and is received in the support zone 23 of the top cover 2.

Accordingly, the acid vapor produced in each of the receiving chambers 11 of the main body 1 can be introduced through the two transverse holes 2121 of the guide portion 212 of each of the support recesses 21 of the top cover 2 and can be returned into each of the receiving chambers 11 of the main body 1, thereby preventing the electrolyte 72 from leaking outward, and thereby increasing the lifetime of the battery jar structure.

Figure 4:
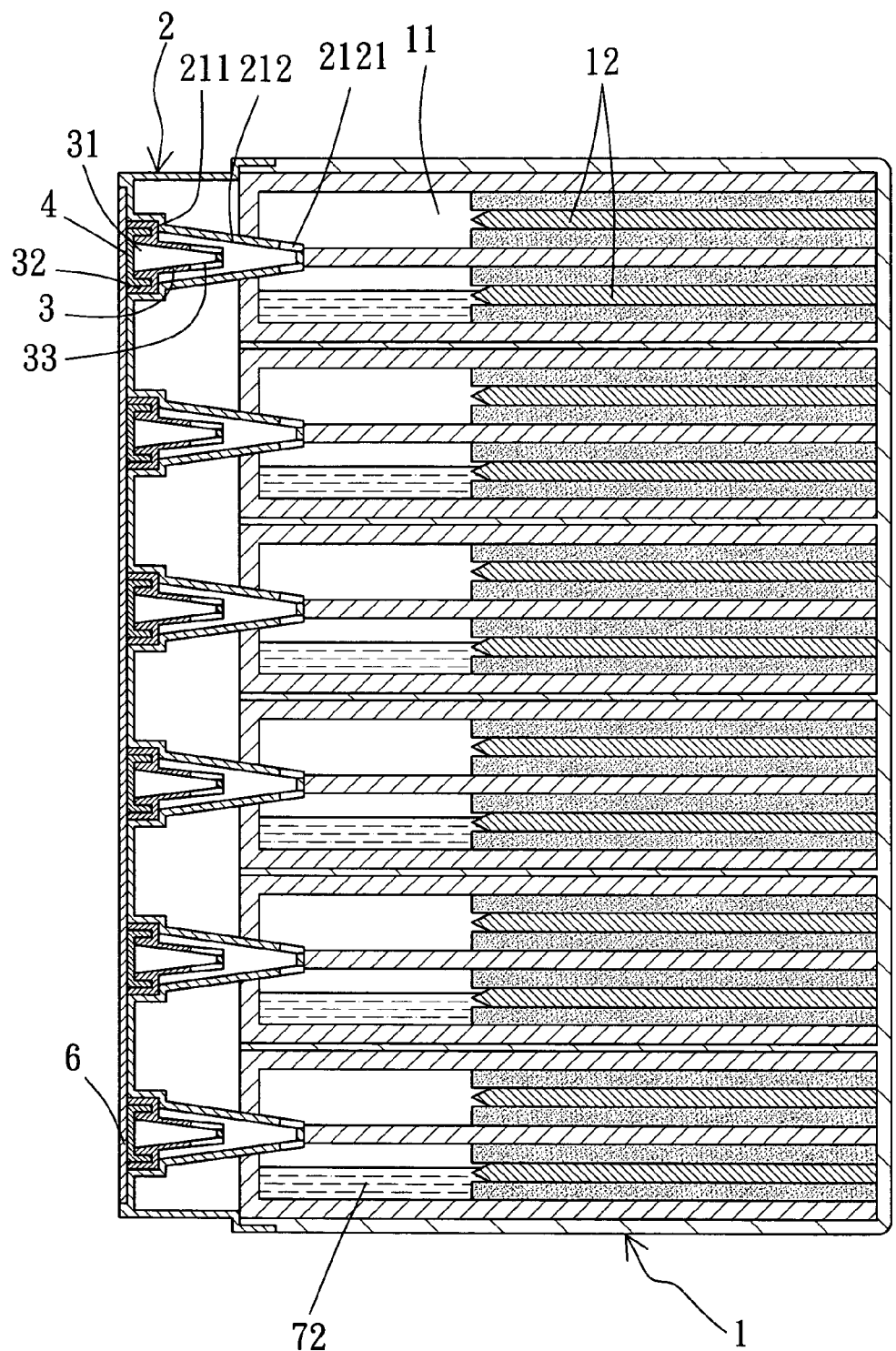
FIG. 4 is a plan cross-sectional assembly view of the battery jar structure which is upset.
Figure 5:
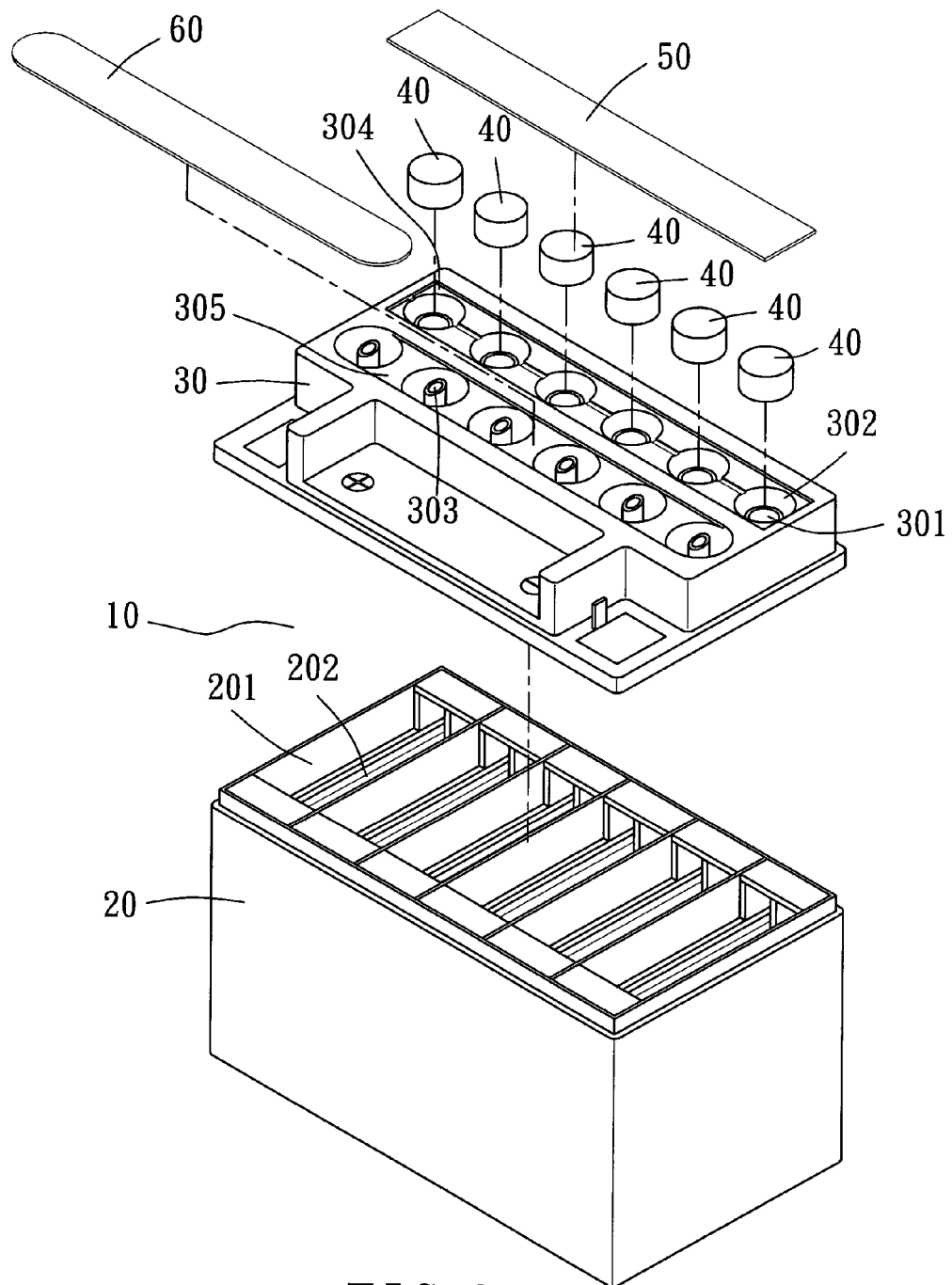
FIG. 5 is an exploded perspective view of a conventional battery jar in accordance with the prior art.
Figure 6:
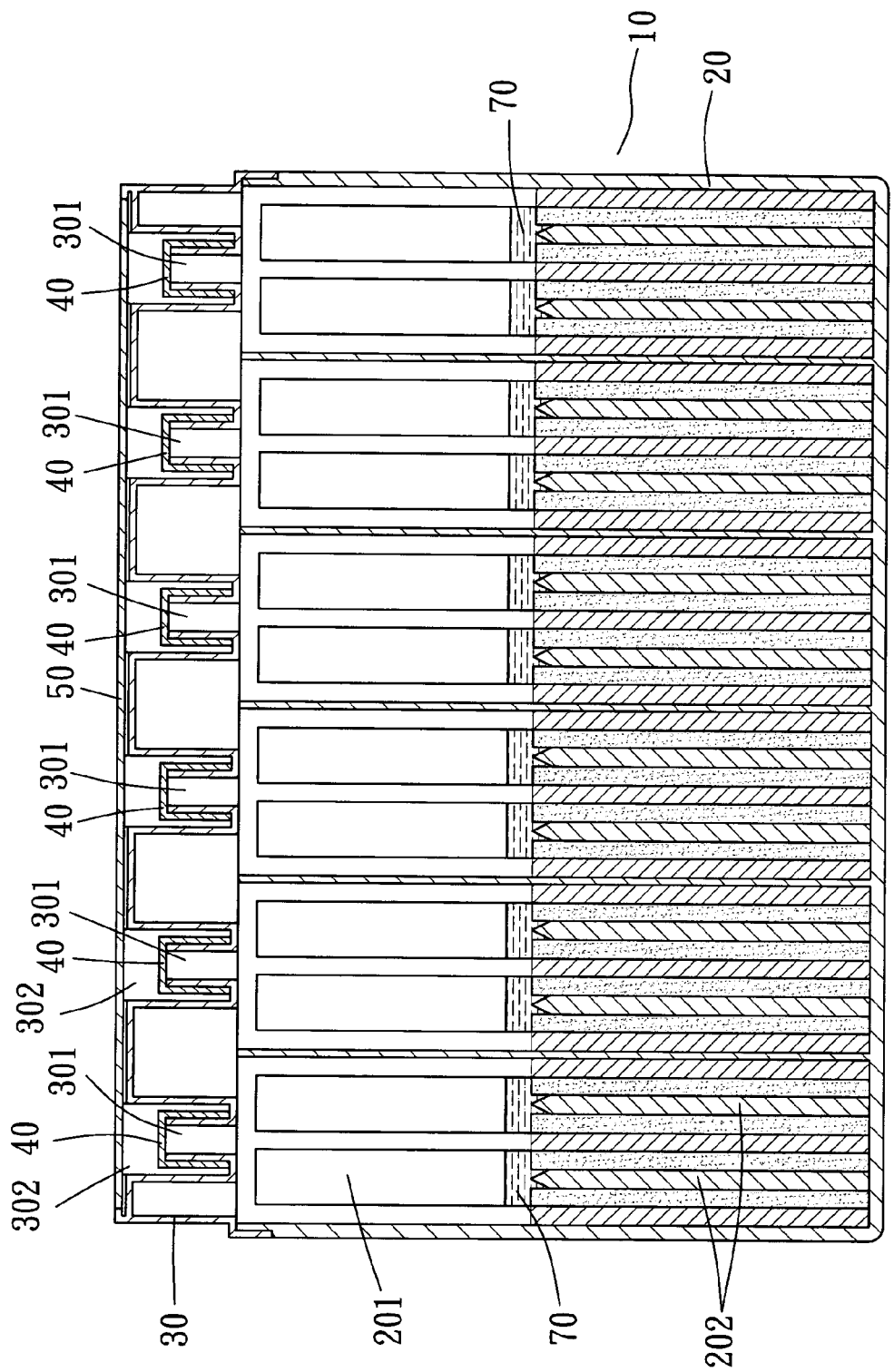
FIG. 6 is a plan cross-sectional assembly view of the conventional battery jar as shown in FIG. 5.
Figure 7:
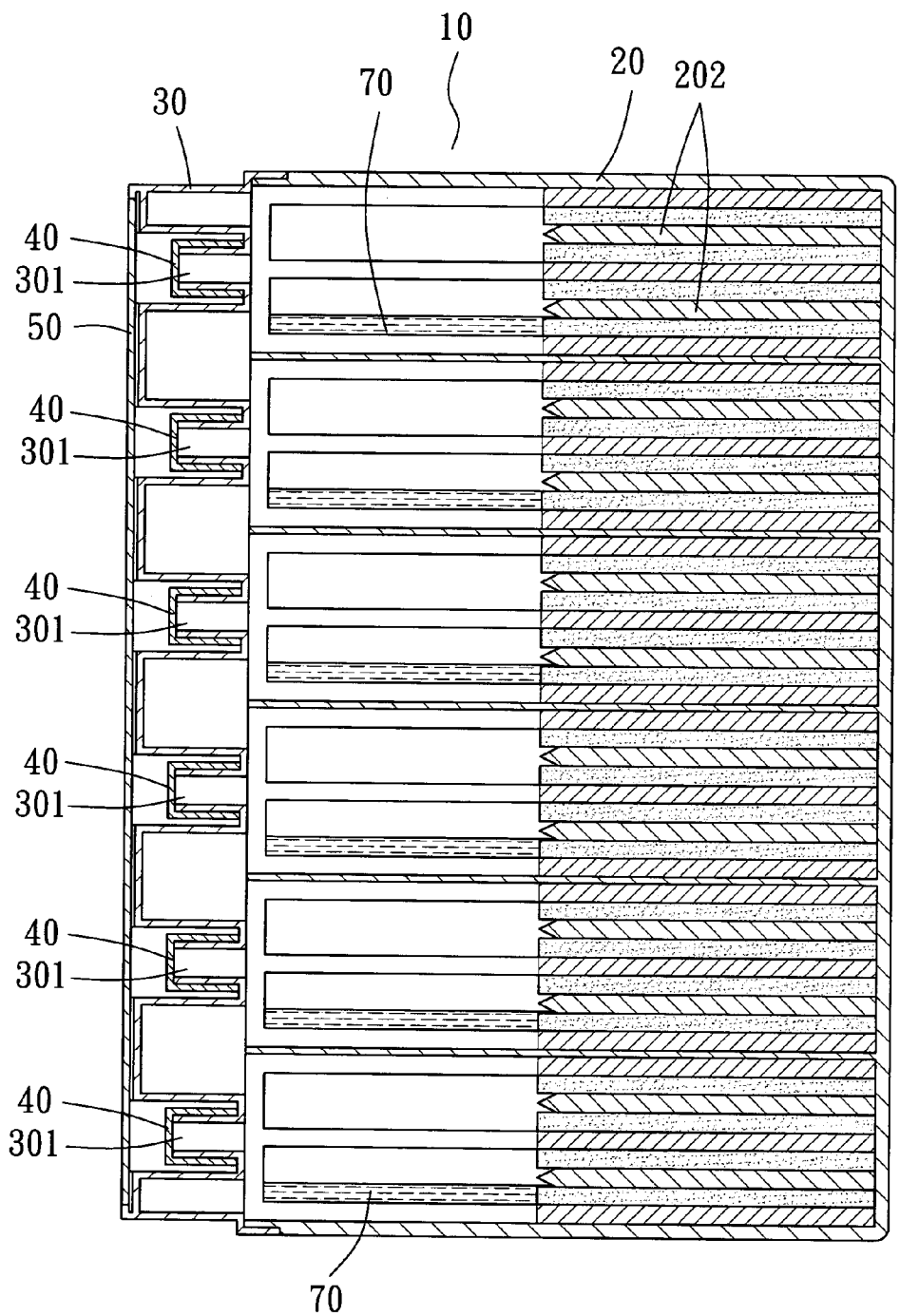
FIG. 7 is a plan cross-sectional assembly view of the conventional battery jar which is upset.

As shown in FIG. 4, when the main body 1 is declined or upset, the guide portion 212 of each of the support recesses 21 of the top cover 2, each of the urging members 3 and each of the inner covers 4 form a close sealing effect, so that the electrolyte 72 cannot flow outward to the ambient environment, thereby preventing the electrolyte 72 from leaking outward when the main body 1 is declined or upset. In addition, the guide portion 212 of each of the support recesses 21 of the top cover 2 and each of the urging members 3 form a double separation effect and achieve an air convection purpose.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A battery jar structure, comprising:
a main body;
a top cover mounted on a top of the main body and formed with a plurality of support recesses each having an inner periphery formed with an annular flange having a bottom provided with a hollow guide portion having a bottom formed with two transverse holes aligning with each other; and
a plurality of urging members each mounted in a respective one of the support recesses of the top cover and each having a bottom formed with two transverse holes aligning with each other.

2. The battery jar structure in accordance with claim 1, wherein the annular flange of each of the support recesses of the top cover is integrally formed with the guide portion.

3. The battery jar structure in accordance with claim 1, wherein the guide portion of each of the support recesses of the top cover has a funnel shape.

4. The battery jar structure in accordance with claim 1, wherein the main body has an inside formed with a plurality of receiving chambers, and the guide portion of each of the support recesses of the top cover is inserted into a respective one of the receiving chambers of the main body.

5. The battery jar structure in accordance with claim 1, wherein the each of the urging members is rested on the annular flange of a respective one of the support recesses of the top cover.

6. The battery jar structure in accordance with claim 1, wherein each of the urging members has an inside formed with a through hole.

7. The battery jar structure in accordance with claim 1, wherein each of the urging members has a top having a periphery formed with an annular groove, and the battery jar structure further comprises a plurality of inner covers each mounted on a respective one of the urging members and each having a bottom inserted into the annular groove of a respective one of the urging members.

8. The battery jar structure in accordance with claim 1, wherein the bottom of each of the urging members has a funnel shape.

9. The battery jar structure in accordance with claim 1, wherein the two transverse holes of the guide portion of each of the support recesses of the top cover communicate with the two transverse holes of each of the urging members.

10. The battery jar structure in accordance with claim 1, wherein the bottom of each of the urging members is inserted into the guide portion of a respective one of the support recesses of the top cover.

11. The battery jar structure in accordance with claim 1, wherein the guide portion of each of the support recesses of the top cover and each of the urging members form a double separation effect and an air convection effect.

* * * * *